(12) United States Patent
Witcher et al.

(10) Patent No.: US 9,205,737 B2
(45) Date of Patent: Dec. 8, 2015

(54) SEAL BODY, APPARATUS AND METHOD

(75) Inventors: Bryan A. Witcher, Erie, PA (US);
Carlos A. Vallejo, Erie, PA (US)

(73) Assignee: General Electric Company,
Schenectady, NY (US)

( * ) Notice: Subject to any disclaimer, the term of this patent is extended or adjusted under 35 U.S.C. 154(b) by 1055 days.

(21) Appl. No.: 13/022,709

(22) Filed: Feb. 8, 2011

(65) Prior Publication Data
US 2012/0200043 A1 Aug. 9, 2012

(51) Int. Cl.
| F16J 15/447 | (2006.01) |
| B60K 17/04 | (2006.01) |
| B60K 17/14 | (2006.01) |
| F16D 65/12 | (2006.01) |
| B60K 7/00 | (2006.01) |

(52) U.S. Cl.
CPC ............ *B60K 17/046* (2013.01); *B60K 17/145* (2013.01); *F16D 65/12* (2013.01); *B60K 7/0007* (2013.01); *B60K 2007/0092* (2013.01)

(58) Field of Classification Search
USPC .................. 277/346–347, 411–412, 418–421
See application file for complete search history.

(56) References Cited

U.S. PATENT DOCUMENTS

| 605,888 | A | * | 6/1898 | Maginot | 415/172.1 |
| 1,672,013 | A | * | 6/1928 | Vroom | 277/413 |
| 2,003,605 | A | * | 6/1935 | Oelkers | 295/42.1 |
| 2,014,859 | A | * | 9/1935 | Mitchell, Jr | 384/480 |
| 2,108,724 | A | * | 2/1938 | Nemetz | 277/420 |
| RE20,747 | E | * | 5/1938 | Simpson | 384/480 |
| 2,245,281 | A | * | 6/1941 | Klopak | 277/419 |
| 2,479,038 | A | * | 8/1949 | Cronstedt | 415/194 |
| 2,587,077 | A | * | 2/1952 | Winther | 277/347 |
| 2,874,982 | A | * | 2/1959 | Winther | 277/423 |
| 2,916,332 | A | * | 12/1959 | Pavlecka | 384/109 |
| 3,908,361 | A | * | 9/1975 | Gardiner | 60/799 |
| 4,189,157 | A | * | 2/1980 | Mahan et al. | 277/301 |
| 4,209,178 | A | * | 6/1980 | MacKenzie | 277/411 |
| 4,406,466 | A | * | 9/1983 | Geary, Jr. | 277/400 |
| 5,598,908 | A | * | 2/1997 | York et al. | 192/21.5 |
| 5,927,720 | A | * | 7/1999 | Zinsmeyer et al. | 277/303 |
| 6,217,219 | B1 | * | 4/2001 | Hoeting | 384/478 |
| 6,325,382 | B1 | * | 12/2001 | Iwamoto et al. | 277/368 |
| 6,834,859 | B2 | * | 12/2004 | Tones | 277/412 |
| 7,311,448 | B2 | * | 12/2007 | Engel et al. | 384/484 |
| 2007/0164516 | A1 | * | 7/2007 | Olsen et al. | 277/347 |
| 2010/0176556 | A1 | * | 7/2010 | Mack et al. | 277/411 |
| 2010/0219585 | A1 | * | 9/2010 | Roddis et al. | 277/347 |

FOREIGN PATENT DOCUMENTS

| GB | 960565 A | 6/1964 |
| NL | 1008191 C2 | 9/1999 |

OTHER PUBLICATIONS

Search Report and Written Opinion from corresponding EP Application No. 12156501.4-2421 dated Jul. 2, 2012.

* cited by examiner

*Primary Examiner* — Vishal Patel
(74) *Attorney, Agent, or Firm* — GE Global Patent Operation; John A. Kramer

(57) ABSTRACT

A seal body for use with a torque tube includes a first portion having an attachment mechanism to releasably secure a torque tube to the first portion, and a second portion configured adjacent to the first portion. The second portion of the seal body includes a substantially uniplanar sealing surface that is orthogonal to an axis of rotation of the torque tube, and that extends across a substantially uniplanar axial end face of the torque tube.

11 Claims, 5 Drawing Sheets

US 9,205,737 B2

SEAL BODY, APPARATUS AND METHOD

FIELD OF THE INVENTION

Embodiments of the invention relate to wheel drive assemblies, and, more particularly, to oil seals for wheel drive assemblies of off-highway vehicles.

BACKGROUND OF THE INVENTION

Off-highway vehicles ("OHVs"), such as, for example, mining vehicles used to haul heavy payloads excavated from open pit mines, usually employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator, in turn, powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque, low speed rotational energy output which is supplied to the rear wheels.

Planetary gear transmissions are generally operated in a wet lubricated condition. As will be appreciated, it is desirable to minimize or prevent leakage of lubricants, e.g., oil, from wheel drive assemblies as such leakage leads to vehicle downtime for disassembly, inspection, and repair. In particular, in OHV wheel drive assemblies that include a rotary torque tube overlying a wheel frame, an oil seal ring may be fastened to the wheel frame so that it engages a complementary seal body mounted on the torque tube. Although the oil seal ring and body form an effective labyrinth seal, operating deflections of the torque tube and of the seal body can produce rubbing wear between the ring and the body such that the sealing function could potentially deteriorate over time.

Further, seal bodies are weight-controlled, which is often accomplished by limiting their axial thickness. Additionally, to avoid the weight of bolted flanges, the body may be interference fit on the torque tube. In designs where the seal body is relatively axially thin, however, an interference fit may cause a "cupping" or "coining" deflection of the body toward the seal ring, which potentially exacerbates rubbing wear.

Accordingly, it is desirable to provide a seal body that provides a durable and reliable seal without being of excessive weight or thickness.

BRIEF DESCRIPTION OF THE INVENTION

In one embodiment of the invention, a seal body for use with a torque tube includes a first portion having an attachment mechanism to releasably secure a torque tube to the first portion, and a second portion configured adjacent to the first portion. The second portion of the seal body includes a substantially uniplanar sealing surface that is orthogonal to an axis of rotation of the torque tube, and that extends across a substantially uniplanar axial end face of the torque tube.

In another embodiment of the invention, an oil seal includes an annular seal body, a torque tube, and a housing. The seal body defines a seal body axis and includes a uniplanar sealing surface that extends substantially across an axial end face of the torque tube. The seal body also includes an axially facing engagement surface opposite the uniplanar sealing surface. The axially facing engagement surface of the seal body includes one or more annular grooves, while the housing has a sealing face that includes one or more seal rings. The housing is operatively connected to the annular seal body for mutual rotation therewith, and a seal ring of the housing protrudes into at least one of the annular grooves formed in the axially facing engagement surface of the seal body.

In yet another embodiment of the invention, an oil seal can be formed by fitting a mating end of a torque tube into a cavity formed in a seal body, such that a substantially flat sealing face formed on the mating end of the torque tube abuts a complementary substantially flat sealing face formed at a bottom surface of the cavity formed in the seal body, and by compressing a seal member between the sealing face of the seal body and the sealing face of the torque tube.

As used herein, the terms "substantial," "substantially," or "about" are intended to indicate a condition within reasonably achievable manufacturing and assembly tolerances, relative to an ideal desired condition suitable for achieving the functional purpose of a component or assembly. By way of an example, a "substantially" flat surface may nonetheless include small, microscopic, or perceptible roughnesses, prominences, or indentations, so long as those non-flat features do not interfere with the intended purpose of the substantially flat surface. Similarly, as another example, an assembly of components in "substantial" alignment to a common axis of rotation may deviate from perfectly co-axial alignment so long as all the components can rotate as intended for accomplishing the functional purpose of the assembly.

Also, as used herein, and as further clarified below, the term "uniplanar" is intended to indicate an absence of prominences or recesses or other features formed on a surface for interlocking engagement with an adjacent surface. Within the intended meaning of "uniplanar," however, a sealing surface may include measurable roughness, circumferential ridging, or other features incidental to manufacturing or advantageous for resisting fluid seepage.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
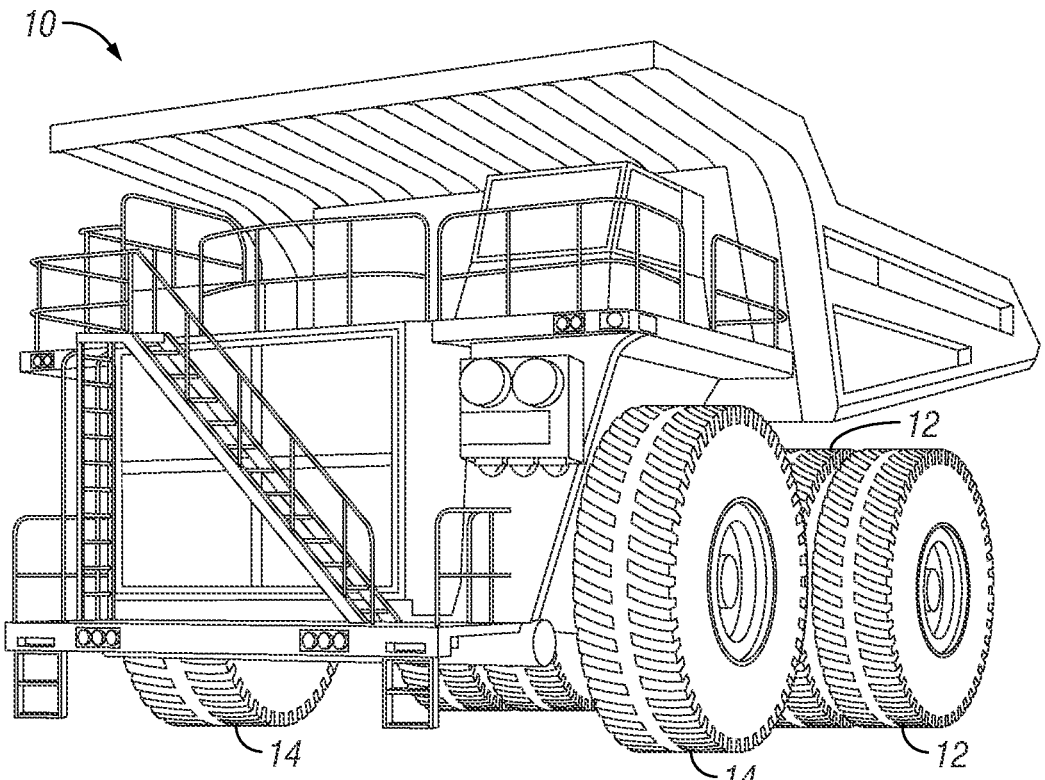
FIG. 1 shows a perspective view of an OHV.
Figure 2:
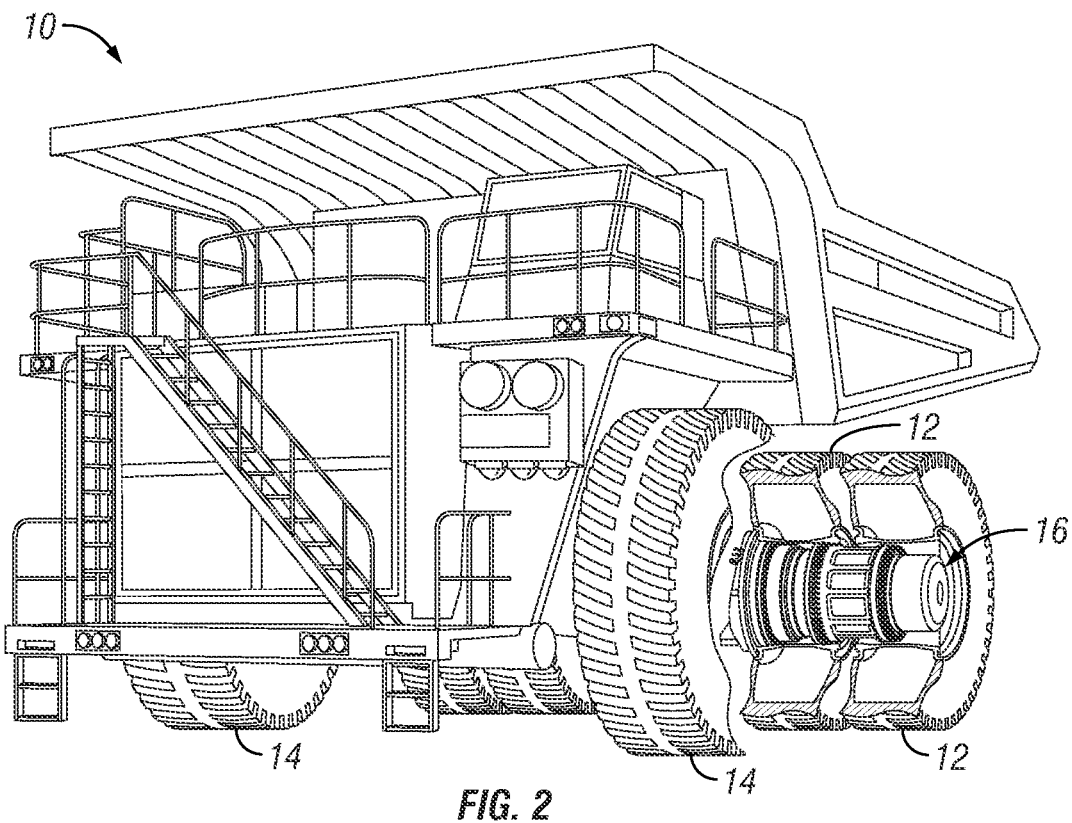
FIG. 2 shows a partial perspective cutaway view showing a wheel drive assembly of the OHV shown in FIG. 1.
Figure 3:
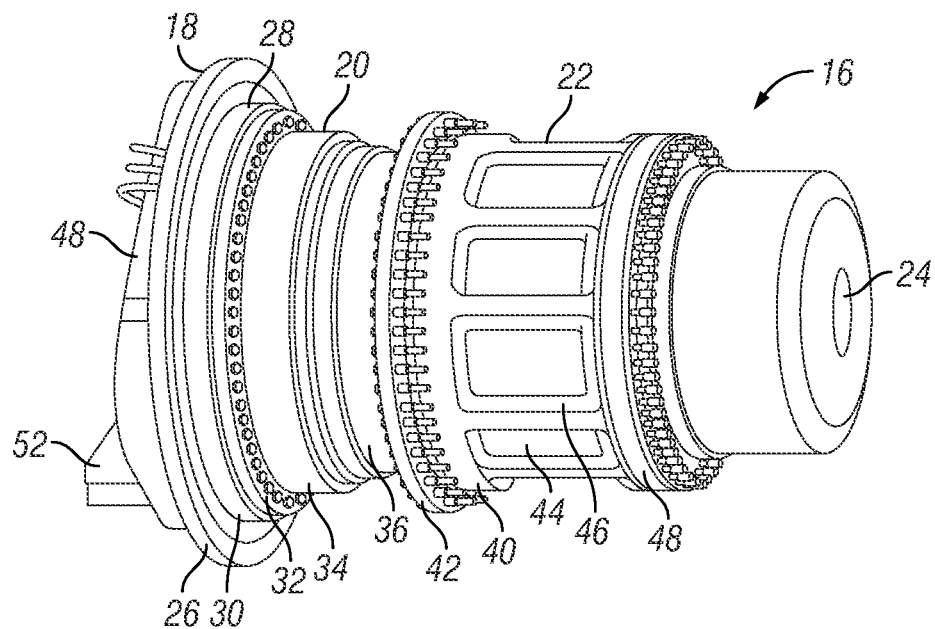
FIGS. 3 and 4 show partial side and end perspective views of the wheel drive assembly shown in FIG. 2 for use with an oil seal in accordance with an embodiment of the present invention.
Figure 4:
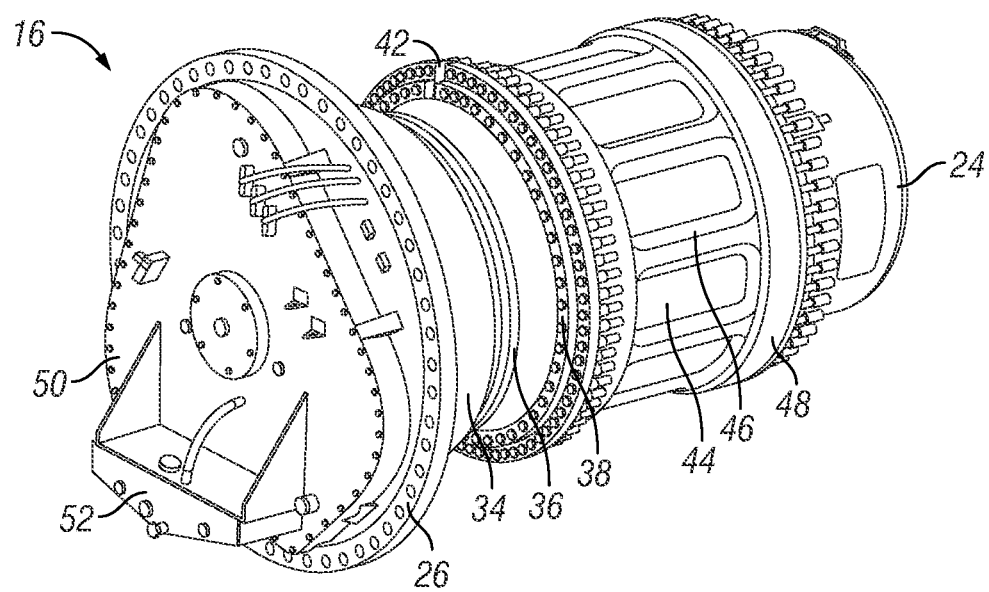

Reference will be made below in detail to exemplary embodiments of the invention, examples of which are illustrated in the accompanying drawings. Wherever possible, the same reference numerals used throughout the drawings refer to the same or like parts.

An embodiment of the inventive oil seal 32 is configured for use with a wheel assembly 16 of an OHV 10 as depicted in FIGS. 1-5. As shown, the OHV 10 is supported on paired dual rear drive tire assemblies 12 and on single front steering tire assemblies 14. Each dual rear drive tire assembly 12 is mounted on a wheel drive assembly 16, which includes a wheel frame 18 as well as the torque tube 20 and a wheel hub 22. The wheel hub 22 is supported on the wheel frame 18 and is fastened to the torque tube 20. The tire assemblies 12 can be bolted to the wheel hub 22, as further discussed below.

The wheel frame 18 also supports a brake assembly 24, which is disposed adjacent to an outboard end of the wheel hub 22 but is not fastened to the wheel hub 22. Axially opposite the brake assembly 24, a gear cover 50 is mounted onto the wheel frame 18.

Each wheel assembly 16 can be bolted to the vehicle 10 by way of a mounting flange 26 provided on the wheel frame 18. The wheel frame 18 is radially tapered from the mounting flange 26, through a generally conical or hyperbolic transition portion 28, to a substantially cylindrical wheel frame barrel portion 52 shown in FIG. 5, discussed below. On the transition portion 28 of the wheel frame 18, an oil seal housing 30 is fixed to the wheel frame 18.

The torque tube 20 includes a ring gear 34 adjacent to the oil seal housing 30, and also includes a tube portion 36 that extends from the ring gear 34 along the wheel frame to a hub flange 38. On the end of the ring gear 34 adjacent to the oil seal housing 30, a complementary seal body 32 is fastened to the torque tube 20. The oil seal housing 30 and the seal body 32 together form a labyrinth seal for containing leakage of oil through the rotary joint between the ring gear 34 and the transition portion 28.

The wheel hub 22 includes a barrel 44 with ribs 46, which extends from an inboard end 40 to an outboard end 48. The inboard end 40 is bolted to the hub flange 38 of the torque tube 20. The wheel hub 22 also includes a rim flange 42, which protrudes radially outward around the inboard end 40 of the wheel hub.

Figure 5:
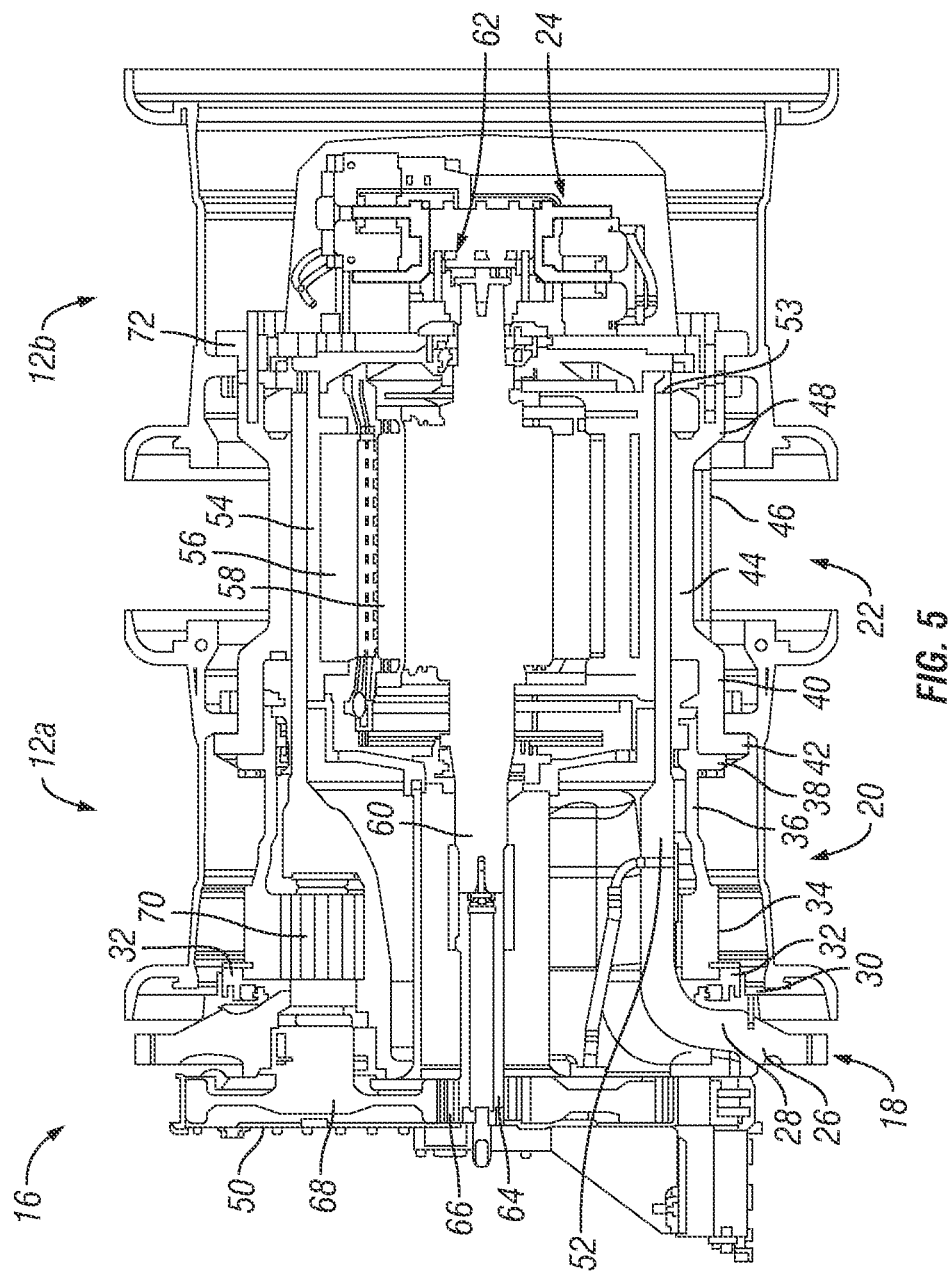
FIG. 5 shows a side sectional view of the wheel drive assembly shown in FIG. 2 illustrating a seal body in accordance with an embodiment of the present invention.

FIG. 5 is a side sectional view showing the several parts of the wheel assembly 16 and their relationship to an embodiment of the seal body 32. At the inboard and outboard ends 40, 48 of the wheel hub 22, inboard and outboard bearings 51a, 51b, respectively, are provided to support the wheel hub on a barrel portion 52 of the wheel frame 18. The wheel frame barrel portion 52 extends from the transition portion 28 to an annular hub end surface 53, to which the brake assembly 24 is mounted. Adjacent the hub end surface 53, an electric motor 54 is housed inside the wheel frame 18.

The electric motor 54 includes a stator 56 and a rotor 58, from which a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the transition portion 28 of the wheel frame 18, a sun gear shaft 64 is splined to the first end of the shaft 60. The sun gear shaft 64 supports a sun gear 66, which is housed centrally within the gear cover 50 and is meshed with a plurality of planet gears 68 carried on common axles with pinion gears 70, which mesh with internal teeth of the torque tube ring gear 34. The torque tube 20 is supported by the pinion gears 70 and the wheel hub 22.

Referring to the wheel hub 22, an inboard tire assembly 12a (partially shown) is bolted to the rim flange 42. At the outboard end 48 of the wheel hub 22, a hub adapter 72 is bolted to the wheel hub 22 and an outboard tire assembly 12b (partially shown) is bolted to the hub adapter 72.

Figure 6:
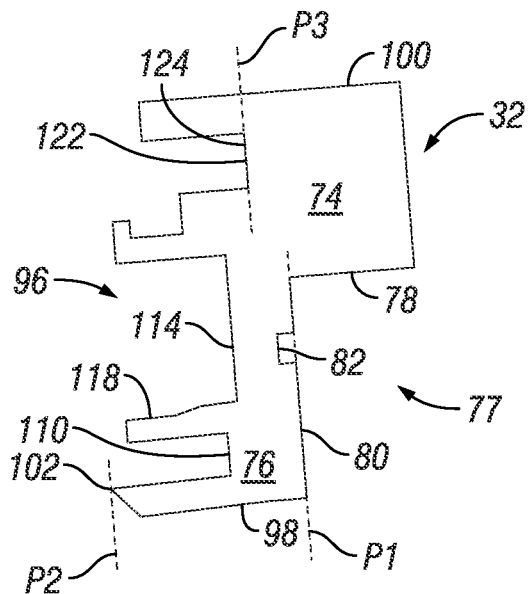
FIG. 6 shows a side sectional partial view of a seal body of FIG. 5.
Figure 7:
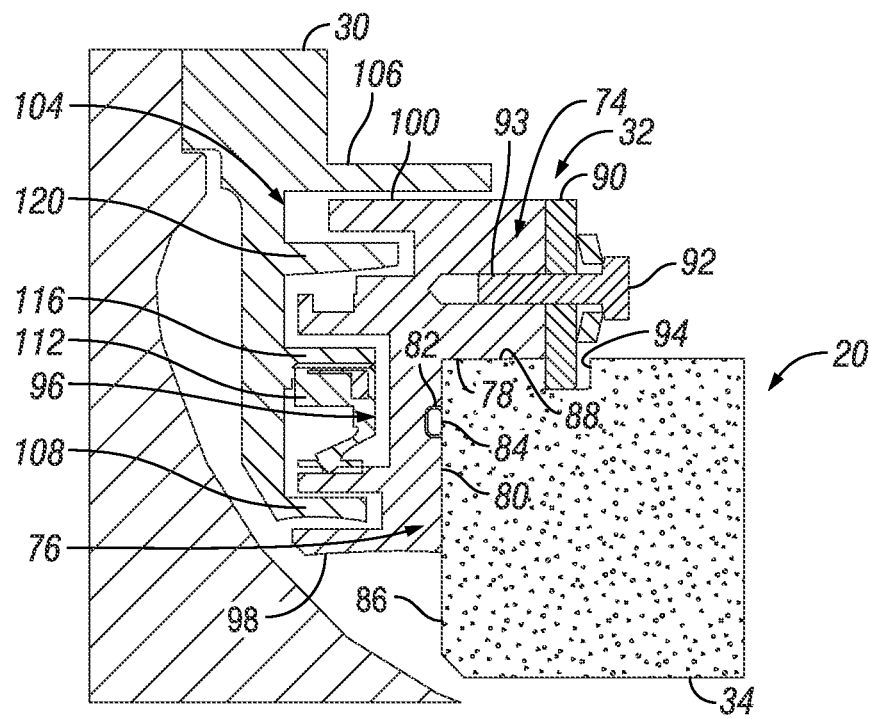
FIG. 7 shows a side sectional partial view of the seal body of FIG. 6 mounted within the wheel drive assembly of FIG. 5.

Turning now to FIGS. 6 and 7, an embodiment of the inventive seal body 32 is depicted, as well as the assembly and interaction of the oil seal housing 30, seal body 32, and ring gear 34. As shown, the radial cross section or profile of the seal body 32 includes a radially outward first portion 74 and a radially inward second portion 76. The first and second portions 74, 76 are joined at a radially inward facing cylindrical contact surface 78. The contact surface 78 surrounds the common axis of rotation shared by the seal body 32 and by the torque tube 20, and defines a cylindrical cavity 77 for attaching the seal body 32 onto the ring gear 34. On the second portion 76, a sealing surface 80 extends radially inward from the contact surface 78 to form a bottom surface of the attachment cavity 77.

In an embodiment, the first portion 74 and the second portion 76 are annular and together define a central shaft opening co-axial with the axis of rotation of the torque tube.

The sealing surface 80 is disposed orthogonally or about orthogonally with reference to the contact surface 78 and with reference to the torque tube axis of rotation. In an embodiment, the sealing surface 80 is radially uniplanar, and, in another embodiment, the sealing surface 80 is flat or substantially flat to reduce mutual wear of the sealing surfaces under operational load. That is, the surfaces do not include interlocking prominences configured to mate with recesses provided on adjacent sealing surfaces.

The uniplanar profile of sealing surface 80 may include, however, a substantially annular seal element groove 82 indented into the surface 80. The seal element groove 82 extends around the common axis of rotation shared by the seal body 32 and the ring gear 34. In use, the seal element groove 82 houses a seal element 84, which may be a deformable seal element such as an O-ring. Notably, the seal element groove 82 does not engage with any prominence of an adjoining surface.

Referring specifically to FIG. 7, the sealing surface 80 of the seal body second portion 76 is assembled in close abutment with a complementary sealing surface 86 formed on an axial end face of the torque tube ring gear 34, which is the portion of the torque tube 20 disposed adjacent to the wheel frame transition portion 28 and to the oil seal housing 30. In an embodiment, the sealing surface 86 on the axial end face of the ring gear 34 is radially uniplanar, and, in another embodiment, the sealing surface 86 is flat or substantially flat. Moreover, in an embodiment, the sealing surface 80 of the second portion 76 extends across a substantially uniplanar axial end face, or sealing surface, of the torque tube ring gear 34. (By "extends across," it is meant that when the torque tube is secured to the first portion, the uniplanar sealing surface of the second portion aligns with, and abuts or lies axially proximate to, the uniplanar axial end face of the torque tube, along the circumference of the seal body and torque tube.)

For maintaining close abutment between the respective sealing surfaces 80, 86, the seal body 32 is attached to the ring gear 34 by way of a mechanism that may include an interference fit between the contact surface 78 formed on the seal body first portion and a complementary radially outward facing contact surface 88 formed on the ring gear 34.

An interference fit, also known as a press fit or friction fit, is a fastening between two parts which is achieved by friction between the parts, rather than by any other attachment mechanism. For metal parts in particular, the friction that holds the parts together is often greatly increased by compression of one part against the other, which relies on the tensile and compressive strengths of the materials the parts are made from. An interference fit is generally achieved by shaping the two mating parts so that one or the other (or both) slightly deviate in size from the nominal dimension. The word interference refers to the fact that one part slightly interferes with the space that the other is taking up.

As shown in FIG. 7, in an embodiment of the present invention, the interference fit between the seal body 32 and the ring gear 34 can be established using a plurality of clamp plates 90 and a plurality of bolts 92 threaded into holes or bores 93 formed in the first portion 74 of the seal body 32. The clamp plates 90, further discussed below with reference to FIG. 8, seat into a clamping groove 94 formed around an outer surface of the ring gear 34. The bolts 92 engage the bores 93 to draw the seal body 32 up to the clamp plates 90, thereby establishing an interference fit between the radially outward facing contact surface 88 of the ring gear 34 and the radially inward facing contact surface 78 of the seal body 32. Also, the bolts and clamp plates can by themselves secure or attach the ring gear 34 into the cavity 77 formed in the seal body 32, even without establishing an interference fit, as further discussed below.

Referring back to FIG. 6, the radial profile of the seal body 32 includes an engagement surface referred to herein as the annularly grooved third portion 96. The third portion 96 extends from a radially inward facing innermost circumferential surface, defining a shaft opening 98, outward to an outermost circumferential surface 100. The third portion 96 of the seal body 32 is joined integrally with the first portion 74 and the second portion 76 at a radial sealing plane P1 defined by the sealing surface 80, and extends axially away from the first and second portions 74, 76 to a radial end plane P2 defined by an edge 102 of the inner circumferential surface 98.

As shown in FIGS. 6 and 7, the oil seal housing 30 includes an outer circumferential wall 106 that surrounds and encloses a sealing face 104 and the outermost circumferential surface 100 of the seal body 32. The sealing face 104 extends radially inward from the circumferential wall 106 to an inner seal ring 108 that fits into an inner annular groove 110 formed in the third portion 96. Between the third portion 96 of the seal body 32 and the sealing face 104 of the oil seal housing 30, a lip seal 112 is housed in a middle groove 114 of the third portion 96. In an embodiment, the lip seal 112 is fastened to a middle ring 116 formed on the sealing face 104, and includes an inner lip that rubs against a radially inward surface 118 of the middle groove 114 formed in the third portion 96.

The lip seal 112 is an intentional wear component, made of materials that can conform to the third portion 96 and to the sealing surface 104 without adversely affecting the radially inward surface 118 on the seal body 32 or the middle ring 116 on the oil seal housing 30. Between the middle ring 116 and the outer wall 106, an outer ring 120 protrudes from the sealing face 104 of the oil seal housing 30 into an annular outer groove 122 formed in the third portion 96.

To minimize deflection of the seal body 32 and third portion 96, and any resulting potential wear on the seal structures described above, the contact surface 78 of the seal body 32 is disposed at a radial location closer to the outer circumferential surface 100 than to the inner circumferential shaft opening 98.

Accordingly, an embodiment relates to a seal body for use with a torque tube that includes a seal body with a first portion and second portion. The first portion includes an attachment mechanism to releasably secure a torque tube to the seal body. The second portion is adjacent to the first portion, and includes a substantially uniplanar sealing surface that is orthogonal to an axis of rotation of the torque tube. The first portion is joined to the second portion at a radial location closer to the outer circumferential surface than to the inner circumferential surface.

Also, in an embodiment, the outer groove 122 is the deepest groove formed in the third portion 96, and is indented only to a bottom groove surface 124 defining a radial plane P3 that lies between the radial sealing plane P1 of sealing surface 80 and the radial end plane P2 defined by circular edge 102.

To mitigate rotational slippage between the seal body 32 and the ring gear 34, even in a case where torque transfer may deform the contact surface 88 of the ring gear 34 and thereby relax an interference fit between the contact surface 88 and the complementary contact surface 78 of the seal body 32, an anti-rotation mechanism can be included in the attachment mechanism 78, 88, 90, 92, 94.

Figure 8:
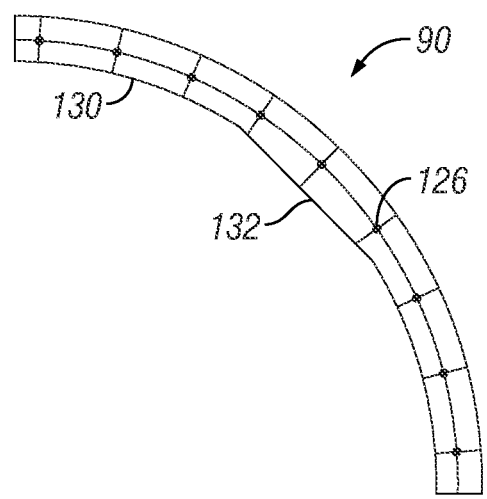
FIG. 8 shows a detail side surface view of a clamp plate according to an embodiment of the present invention for use with the seal body shown in FIGS. 5-7.

Referring to FIG. 8, in one embodiment of an anti-rotation mechanism, each of four clamp plates 90 is generally arcuate in shape and extends around about one quarter of a circle (about ninety degrees). Each clamp plate 90 has a generally concave radially inward surface 130, on which a flattened portion 132 corresponds to a flattened portion (not shown) formed in the clamping groove 94 on the ring gear 34. When assembled together, the flattened portions 132 of the clamp plates 90 rotationally lock the clamp plates to the ring gear 34. The seal body 32 thereby is locked against rotation relative to the ring gear 34. In an embodiment, as shown in the exemplary embodiment shown in FIG. 8, the flat portion 132 of each clamp plate 90 may extend across about one quarter to one third of the arc of the clamp plate; in another embodiment, across about twenty five to thirty five degrees of arc.

Thus, an oil seal can be established at the joint between the ring gear 34 and the seal body 32 by fitting the ring gear 34 into the cavity 77 formed in the seal body 32 so that the sealing surface 86 formed on the ring gear 34 is brought in close abutment to the sealing face 80 formed on the seal body 32. Further, the oil seal can be enhanced by compressing the sealing surface 86 against the annular sealing element or O-ring 84 housed in the seal element groove 82 formed in the sealing surface 80. More particularly, the ring gear 34 may be fitted into the cavity 77 of seal body 32 in an interference fit.

An embodiment of the present invention relates to a seal body for a wheel assembly of an OHV (e.g., 300 ton+ haul truck for mining). The seal body includes a first portion and a second portion. The first portion includes an attachment mechanism to releasably secure a torque tube of the wheel assembly to the first portion. The second portion is configured adjacent to the first portion, and includes a substantially uniplanar sealing surface that is orthogonal to an axis of rotation of the torque tube, when the torque tube is secured to the first portion by the attachment mechanism. The attachment mechanism is configured for holding the torque tube in an orientation with respect to the second portion, such that when the torque tube is secured to the first portion by way of the attachment mechanism, the substantially uniplanar sealing surface extends across a substantially uniplanar axial end face of the torque tube.

Another embodiment of the present invention relates to a seal body for use with a torque tube. The seal body includes a first portion and a second portion. The first portion includes an attachment mechanism to releasably secure a torque tube of the wheel assembly to the first portion. The second portion is configured adjacent to the first portion, and includes a substantially uniplanar sealing surface that is orthogonal to an axis of rotation of the torque tube, when the torque tube is secured to the first portion by the attachment mechanism. The attachment mechanism is configured for holding the torque tube in an orientation with respect to the second portion, such that when the torque tube is secured to the first portion by way of the attachment mechanism, the substantially uniplanar sealing surface extends across a substantially uniplanar axial end face of the torque tube. The seal body being annular and having a central shaft opening co-axial with the axis of rotation of the torque tube.

Another embodiment relates to a wheel assembly for an OHV (e.g., 300 ton+ haul truck for mining). The wheel assembly includes a seal body and a torque tube. The seal body has a first portion and a second portion. The first portion includes an attachment mechanism; the torque tube is releasably secured to the first portion by the attachment mechanism. The second portion is configured adjacent to (e.g., located adjacent to) the first portion, and includes a substantially uniplanar sealing surface that is orthogonal to an axis of rotation of the torque tube. The substantially uniplanar sealing surface extends across a substantially uniplanar axial end face of the torque tube.

Another embodiment relates to an OHV (e.g., 300 ton+ haul truck for mining) having at least two wheel assemblies. Each of the at least two wheel assemblies includes a seal body and a torque tube. The seal body has a first portion and a second portion. The first portion includes an attachment mechanism; the torque tube is releasably secured to the first portion by the attachment mechanism. The second portion is configured adjacent to (e.g., located adjacent to) the first portion, and includes a substantially uniplanar sealing surface that is orthogonal to an axis of rotation of the torque tube. The substantially uniplanar sealing surface extends across a substantially uniplanar axial end face of the torque tube."

The inward facing contact surface of the seal body is adapted for an interference fit with an adjacent outward facing surface of the torque tube. In selected embodiments, the seal body is annular and includes inner and outer circumferential surfaces, and the first portion of the seal body is joined to the second portion of the seal body at a radial location closer to the outer circumferential surface than to the inner circumferential surface. In selected embodiments, the uniplanar sealing surface includes an annular groove configured to receive a deformable seal member. The deformable seal member may be an O-ring. In selected embodiments, the attachment mechanism associated with the first portion of the seal body includes at least one bore formed in the first portion, the bore being configured to removably receive a fastener. The seal body also may include a third portion axially opposite the first portion and second portions. The third portion may be configured for engagement with a seal ring and may include at least one annular groove, which may have a depth defined by a bottom groove surface. The third portion of the seal body may form a labyrinth seal with the seal ring. In selected embodiments the third portion has an axially outermost surface defining a radial end plane, the uniplanar sealing surface of the second portion defines a radial sealing plane, and the bottom groove surface of the annular groove in the third portion is located between the radial sealing plane of the second portion and the radial end plane of the third portion.

Another embodiment relates to forming an oil seal by fitting a mating end of a torque tube into a cavity formed in a seal body, such that a substantially flat sealing face formed on the mating end of the torque tube abuts a complementary substantially flat sealing face formed at a bottom surface of the cavity formed in the seal body, and by compressing a seal member between the sealing face of the seal body and the sealing face of the torque tube. Fitting the seal body to the torque tube may include establishing an interference fit between the mating end of the torque tube and the cavity formed in the seal body.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those ordinarily skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described seal body, apparatus and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A seal body for use with a torque tube, comprising:
   a first portion including an inward facing contact surface and an attachment mechanism to releasably secure the torque tube to the first portion;
   a second portion joined to the first portion, the second portion including a substantially uniplanar sealing surface defining a radial sealing plane that is orthogonal to an axis of rotation of the torque tube when the seal body is attached to the torque tube, the uniplanar sealing surface of the second portion and the inward facing contact surface of the first portion forming a substantially ninety-degree interior angle therebetween and defining a cylindrical cavity configured to receive an end of the torque tube; and a third portion axially opposite the first portion and the second portion and extending from a radially inward facing innermost circumferential surface defining a shaft opening, outward to an outermost circumferential surface, the third portion having an axially outermost surface defining a radial end plane and including a plurality of annular grooves configured for engagement with a seal ring, each of the grooves having a depth defined by a bottom groove surface;

wherein the bottom groove surface of a deepest of the plurality of annular grooves defines a third radial plane that lies between the radial sealing plane of the uniplanar sealing surface and the radial end plane;

wherein the plurality of grooves are located between the radial end plane and the third radial plane; and wherein the substantially uniplanar sealing surface extends across a substantially uniplanar axial end face of the torque tube when the seal body is attached to the torque tube.

2. The seal body of claim 1, wherein the seal body is annular and the shaft opening comprises a central shaft opening that is co-axial with the axis of rotation of the torque tube.

3. The seal body of claim 1, wherein the inward facing contact surface is adapted for an interference fit with an adjacent outward facing surface of the torque tube.

4. The seal body of claim 1, wherein the seal body is annular; and the first portion is joined to the second portion at a radial location closer to the outermost circumferential surface than to the innermost circumferential surface.

5. The seal body of claim 1, wherein the substantially uniplanar sealing surface includes an annular recess configured to receive a deformable seal member.

6. The seal body of claim 5, wherein the deformable seal member is an O-ring.

7. The seal body of claim 1, wherein the attachment mechanism includes at least one bore formed in the first portion, the bore being configured to removably receive a fastener.

8. The seal body of claim 1, wherein the third portion of the seal body is configured to form a labyrinth seal with the seal ring.

9. The seal body of claim 1, wherein the plurality of annular grooves is three grooves including an inner groove adjacent to the innermost circumferential surface, an outer groove adjacent to the outermost circumferential surface, and a middle groove intermediate the inner groove and the outer groove.

10. The seal body of claim 9, wherein each bottom groove surface is located between the third radial plane and the radial end plane of the third portion.

11. The seal body of claim 10, wherein the outer groove is the deepest groove of the plurality of annular grooves.

* * * * *